INVENTORS
DONALD F. SPRENGELER
BY M. D. O'Brien
Q. Baxter Warner
ATTORNEYS

2,928,982

CATHODE RAY TUBE COLOR DECODER SYSTEM

Donald F. Sprengeler, Englewood, Colo., assignor, by mesne assignments, to the United States of America as represented by the Secretary of the Navy Application December 11, 1957, Serial No. 702,217

8 Claims. (Cl. 315—13)

This invention relates generally to decoding systems, and particularly to an improved decoding system for decoding information in the form of electrical pulses and spaces transmitted over a plurality of channels to control a plurality of loads, such as the electron guns of a multi-color cathode ray tube display.

In radar systems it frequently is desirable to view only targets acquired by the radar and to display those targets in a color characteristic of the targets status. A specific example of the problem exists in automatic-track-while-scan (ATWS) radar. Such a radar will automatically track and supply electrical position data on a plurality of moving targets. The target data is usually displayed on the screen of a cathode ray tube and, in a particular display, it may be desirable to view only the targets acquired by the radar. This display may show an associated target number written within a circle whose center represents the coordinates of the target. The circle and associated number may be written in one of three colors representing a target status thereby giving the viewer a clear understanding of the situation. The information concerning the status of the target is received from an information source such as, for example, a fire-control console. This information is received and stored by a control computer which then codes the information in proper sequence in the form of instructions and then transmits them in a pulse train. The instructions may be decoded by a decoding circuit and in response thereto a proper color may be shown on the display for the period of each bit of instruction. Thus, a target may be displayed in a color characteristic of its status. Simultaneously, number and circle writing deflection information concerning the associated target is applied to the display.

One object of the present invention is to provide an improved method of controlling a plurality of loads with a circuit containing a lesser number of inputs wherein the input instructions each include a train of pulses comprising a series of pulses and spaces.

The invention has particular application, for example, in radar systems for converting signals representing the status of the target into a display of a characteristic color on the screen of a multi-color display system. In that application, a further object is to provide an improved system to decode instructions applied on two inputs and to select and control one or more of the three electron guns in accordance with such instructions.

The foregoing objects are accomplished in accordance with the invention by providing an electronic circuit wherein a plurality of loads are controlled in accordance with instructions in the form of trains of pulses and spaces transmitted over a plurality of channels. The control function is determined by comparing bits of instructions in the form of a zero or a positive potential on one channel with respect to any other channel.

Other objects and many of the attendant advantages of this invention will be readily appreciated as the same becomes better understood by reference to the following detailed description when considered in connection with the accompanying drawings wherein.

Figure 1:
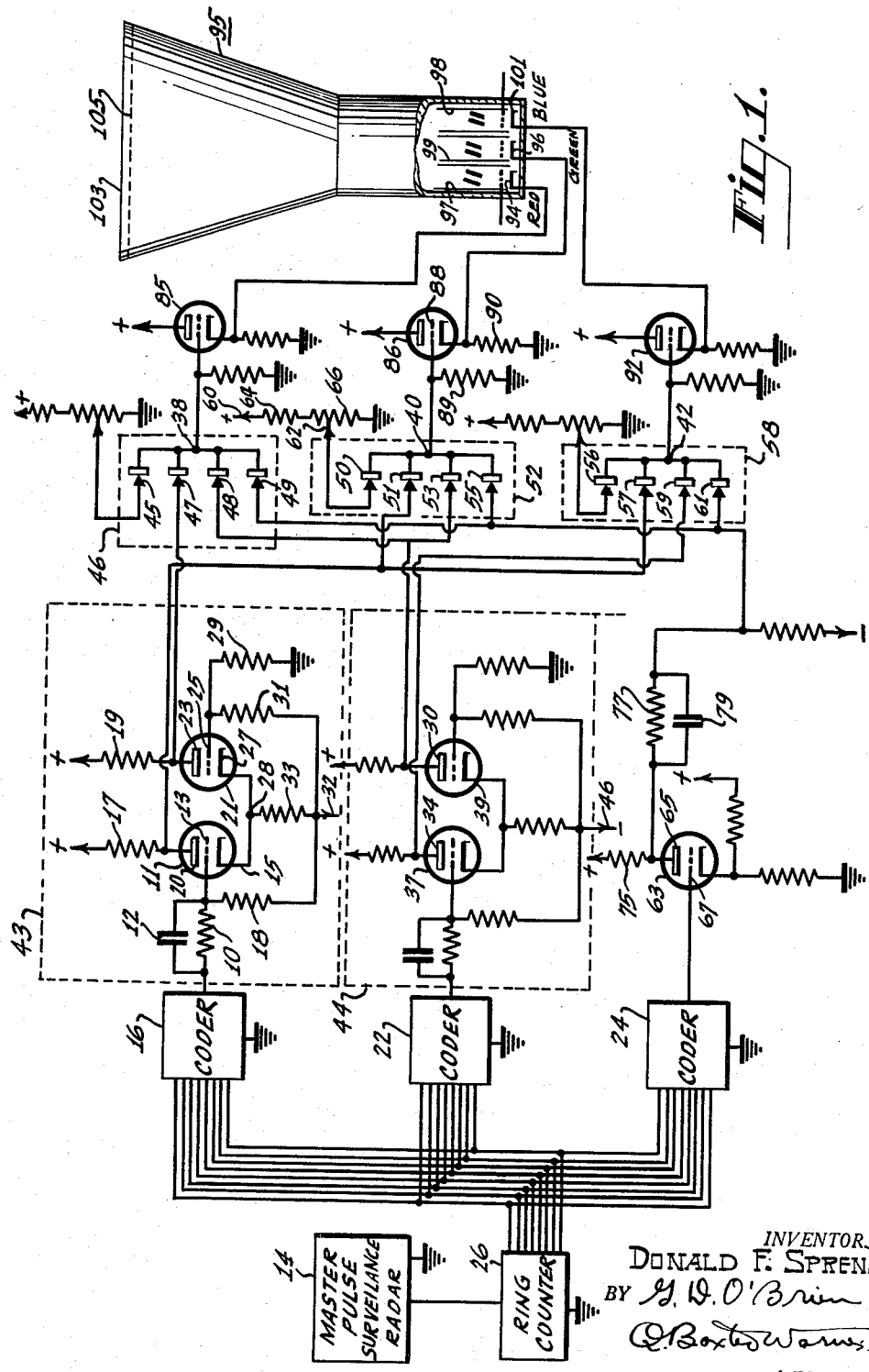
Fig. 1 is a schematic diagram of a preferred embodiment of the invention.

In a typical embodiment of the invention, the coded bits of instructions in the form of either spaces or pulses are applied to the decoder over three separate channels. Two of the channels feed separate dual tube flip-flop networks, each channel feeding its own network. The flip-flop network derives positive and negative potentials in the form of pulses corresponding to the input spaces and pulses. A pulse input to one of the networks causes one tube of the network to produce a positive pulse while simultaneously the other tube produces a negative pulse. A space (that is, when there is zero input) results in the reverse of the above situation. The pulses produced by the tubes in the flip-flop networks are applied to particular diodes in each of three "AND" diode matrices, each containing a plurality of diodes. The diode matrices are connected to the flip-flop networks in an interlaced rectangular array of a "halves" configuration as described in Pulse and Digital Circuits, Millman and Taub, p. 422. A positive pulse applied to any diode in a diode matrix causes that diode to conduct whereby the output of that diode matrix is then at the positive potential of the pulse. No positive pulses are applied to the diodes in one matrix and one positive pulse is applied to diodes in each of the other two matrices during the interval of one bit of instruction. A particular input instruction determines the arrangement of the positive and negative pulses thereby also determining which matrices contain the conducting diodes. Each diode matrix is connected through a cathode follower to a particular electron gun of a three electron gun color kinescope. The two electron guns associated with the two matrices containing conducting diodes are cut off while the other electron gun is allowed to function. Therefore, the codes instructions applied to the decoder on two channels will control the functioning of the electron guns so that only the one proper electron gun will operate.

Similar reference characters are applied to similar elements throughout the drawings.

Referring now to Fig. 1, a typical multi-color television kinescope 95 includes an aperture mask 105, an electron gun 97 for red color, an electron gun 99 for green color, and an electron gun 98 for blue color, to be displayed on a phosphor dot screen 103. The electron guns are tilted in such a manner that the electron beams all fall in the same general area of the screen, but each one excites a phosphor of a different color because of the different angle of approach to the aperture mask 105.

Bits of instruction in the form of pulses and spaces are applied to the circuit of the preferred embodiment from decoders 16 and 22. Flip-flop networks 43 and 44 derive positive and negative potentials in the form of pulses corresponding to these input pulses and spaces. These positive and negative potentials are fed to "AND" diode matrices 46, 52, and 58 which are "AND" gates, thereby controlling the functioning of the three electron guns 97, 98 and 99.

Figure 2:
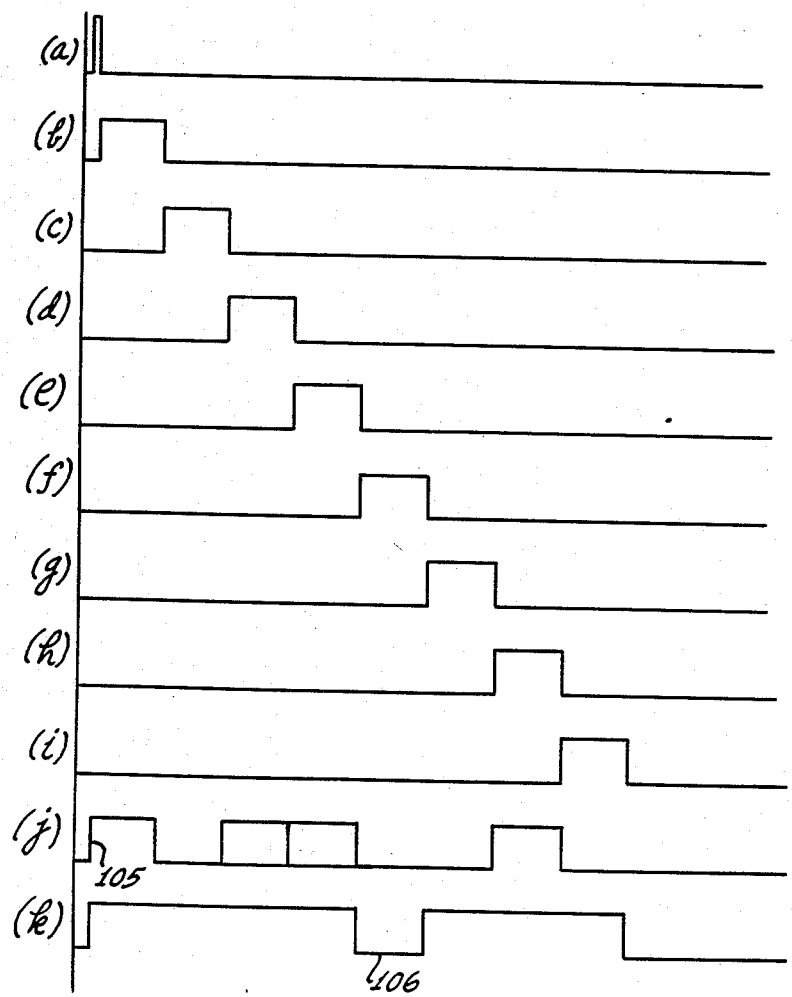
Figs. 2a through 2k are referred to in explaining the invention.

A specific example of where this embodiment of the invention may be used is in an automatic-track-while-scan radar system, this radar system having been described earlier. In a control computer of this radar system, a ring counter 26 supplies the train of pulses that are to be coded. In a common ring counter, one tube in the ring is in a conduction state while all the other tubes are in a non-conducting state. An input master pulse as shown in Fig. 2a from a surveillance radar 14 is applied simultaneously to all tubes of the ring counter 26 and causes the conducting state to progress one step around the ring. Then each tube in the ring conducts and causes the next tube to conduct. Therefore, if an output is connected to each tube of an eight tube ring counter, the wave shapes appear as square waves as in Figs. 2b through 2i.

The pulses of Figs. 2b through 2i are fed from the ring counter 26 to coders 16, 22 and 24. Each of the coders 16, 22 and 24 has a plurality of switch circuits. The operation of coder 24 will be described hereinafter. Coders 16 and 22 are gates in which each received pulse is fed to an individual switching circuit. The position of each such switch determines whether its associated pulse is to be transmitted through the coder. The outputs of the switching circuits are connected in parallel so that the output of the coders 16 and 22 is a coded time sample composite of all the input pulses.

In a specific example of a coder, a particular switch circuit is related to a numbered target, such target being in one of three possible statuses. The problem is to display the target's position in a color representative of its status. The status of the target may be known by the fire control or designation console. These consoles have circuits which position the particular switch circuit in relation to the status of the target. The particular switch circuit is positioned thereby determining whether a pulse or a space is transmitted by the coders 16 and 22 for the time segment concerned with the particular target. This instruction will ultimately control the operation of a desired color on phosphor dot screen 103. The entire coded instruction from either coder 16 or 22 may appear at a given time as shown in Fig. 2j. Pulse 105 in Fig. 2j would be the coded instruction on one of the channels for a specific target for that time slot.

Referring again to Fig. 1, the output of the coders 16 and 22 are applied to the flip-flop networks 43 and 44, respectively. Flip-flop network 43 will be used as an example to demonstrate the operation of a monostable multivibrator network during the time of a pulse and during the time of a space. This network may include, for example, a pair of triodes in a paraphase arrangement. The pulse and spaces from the coder 16 are applied through a parallel combination of a speed-up capacitor 12 and a grid resistor 10 to the control grid 13 of first tube 11. The speed-up capacitor 12 allows the voltage across the grid resistor 10 to rise quickly. The high frequency components of the step function generated by the input pulse are transferred rapidly.

When a pulse is transmitted by the coder 16, the first tube 11 of the flip-flop network 43 becomes conductive and current flows from the anode supply through a plate-load resistor 17, through cathode resistor 33 to the negative cathode supply 32. The values of plate-load resistor 17 and cathode resistor 33 are so selected that the potential at anode 20 of the first tube 11 when conduction takes place is a small negative value, such as minus 25 volts, with respect to ground. Current flowing through the cathode resistor 33 causes the potential at a junction 28 of coupled cathodes 15 and 27 of the first tube 11 and the second tube 21 of the flip-flop network, to rise, that is to become more positive. A control grid 25 of the second tube 21 is normally maintained cut off by a constant negative bias by means of a bias resistor 31 and a grid-resistor 29. The bias resistor 31 is connected in series between the control grid 25 and the negative cathode supply 32 and the grid resistor 29 completes the path from the control grid 25 to ground. When a pulse is applied to the control grid 13 of the first tube 11, the potential at the junction 28 rises causing the cathode 27 to become more positive and since the control grid 25 of the second tube 21 is maintained at a constant bias, tube 21 is cut off.

When no pulse, or zero potential, is transmitted by coder 16, the first tube 11 is cut off by the biasing arrangement of the grid-resistor 10 and the bias-resistor 18. The second tube 21 is normally cut off and therefore, no current flows in cathode resistor 33. Thus, the potential of the coupled cathodes 15 and 27 at junction 28 decreases to the potential of the negative supply potential 32. The control grid 25 of the second tube 21 is biased to a more positive value that the negative supply potential 32. Therefore, the grid to cathode potential of the second tube 21 is such that tube 21 conducts. Thus, when no pulse is transmitted by coder 16, the first tube 11 is cut off and the second tube 21 conducts.

A pulse applied to the control grid 13 of the first tube 11 causes it to conduct and the second tube 21 to be cut off, whereby the anode 20 of the first tube 11 is at a slight negative potential as a result of the large drop in the load resistor 17, and the anode 23 of the second tube 21 is at the potential of its anode supply. When a space, that is a zero potential, is applied to the control grid 13 of the first tube 11, the reverse of the above situation is observed. Thus, the anode 20 of the first tube 11 is at the potential of its anode supply and the anode 23 of the second tube 21 is at a slight negative potential. The operation of the second flip-flop network 44 comprising a first tube 37 and a second tube 39 is identical to the operation of the first flip-flop network 43. The purpose of the flip-flop networks 43 and 44 is to derive opposite potentials from the input pulses and spaces and provide amplification before these potentials are applied to the "AND" diode matrices 46, 52 and 58.

In order to demonstrate the operation of the diode matrices 46, 52 and 58, a specific example will be given. The switches in the switch circuits in the coders 16 and 22 are so selected that a pulse appears at the output of the first coder 16 and a space appears at the output of the second coder 22, thereby developing the code for the color green. At this particular time in the first flip-flop network 43, the first tube 11 conducts and the second tube 21 is cut off. In the second flip-flop network 44, the first tube 37 is cut off and the second tube 39 conducts. The anode of each tube is connected to a plate or plates of associated switching gate diodes located in the three "AND" diode matrices 46, 52 and 58. The "AND" diode matrices 46, 52 and 58 are each associated with a particular electron gun. A red diode matrix 46 is connected through a cathode follower 85 to the red-writing electron gun 97. A green diode matrix 52 is connected through a cathode follower 86 to the green-writing electron gun 99. A blue diode matrix 58 is connected through a cathode follower 92 to the blue-writing electron gun 98.

As was mentioned before, in the first flip-flop network 43, the first tube 11 conducts and the second tube 21 is cut off, whereby a negative pulse appears at the anode 20 of the first tube 11 and a positive pulse appears on the anode 23 of the second tube 21. The negative pulse appearing at the anode 20 is applied to the plates of a diode 51 of the green diode matrix 52 and a diode 57 of the blue diode matrix 58. The negative pulse cuts off diodes 51 and 57 because of the negative potential applied to their plates. The positive pulse on the anode 23 is applied to a diode 47 of the red diode matrix 46, causing this diode to conduct.

As was described before, in the second flip-flop network 44, the first tube 37 is cut off and the second tube 39 conducts, whereby a positive pulse appears at the anode 34 of the first tube 37 and a negative pulse appears at the anode 30 of second tube 39. The positive pulse on anode 34 is applied to a diode 59 of the blue diode matrix 58, causing this diode to conduct. The negative pulse on the anode 30 is applied to the plates of a diode 53 of the green diode matrix 52 and a diode 48 of the red diode matrix 46. The negative pulse cuts off these diodes because of the negative potential applied to their plates.

The diodes in each of the "AND" diode matrices 46, 52 and 58 are connected with their cathodes coupled at junctions 38, 40 and 42 respectively. When a diode conducts, the potential of the associated junction rises to the potential applied to that diode. Each junction is coupled to an associated cathode follower controlling one of the electron guns 97, 98 and 99, so that the potential at a particular junction controls the functioning of a predetermined electron gun. The positive pulses applied to diodes 47 and 59 causes them to conduct thereby applying a positive bias to two of the cathode followers 85 and 92 respectively. The bias is at such a level that the output of these cathode followers 85 and 92 is sufficient to raise the potential of the cathodes 94 and 101 of the red-writing electron gun 97 and the blue-writing electron gun 98 to a value which cuts them off. There has been no positive pulse applied to the diode matrix 52 so that the output of its associated cathode follower 86 maintains the green-writing electron gun 99 in a conductive state. Therefore, when a pulse is applied to the first flip-flop network 43 and no pulse is applied to the second flip-flop network 44, the red-writing electron gun 97 and the blue-writing electron gun 98 are cut off and the green-writing electron gun 99 conducts.

Intensity controls are used to control the brightness of the individual electron guns. As an example of an intensity control, resistors 64 and 66, acting as an intensity control for the green-writing electron gun 99, are connected between a positive potential 60 and ground. A tap 62 on the intensity control is connected to diode 50 of the green diode matrix 52. The tap position is so chosen that the diode 50 conducts but a small positive potential is thereby applied to the control grid 88 of the cathode follower 86. The resultant output of the cathode follower 86 is applied to the cathode 96 of the green-writing electron gun 99 thereby determining the color intensity on the phosphor dot screen 103. A particular code has therefore selected a color green to be displayed on the phosphor dot screen 103.

Of the coders mentioned in the early part of this description, the coder 24 (hereinafter called assign coder 24) operates such that when targets are being assigned, the decoder is allowed to operate normally but, when targets are not being assigned, all the electron guns 97, 98 and 99 are cut off. The assign coder 24 receives a train of pulses from the ring counter 26 as shown in Figs. 2b through 2i, and its operation is identical to that of the coders 16 and 22. The switching state of the assign coder is determined by whether there is a target assigned to a specific time slot. When targets are assigned, a continuous positive potential, as shown in Fig. 2k, is applied to the input of a control tube 63 from the output of the assign coder 24. The control tube 63 conducts whereby its anode 65 is at a lower potential than its anode supply, as a result of the potential drop in a load resistor 75. This negative potential is applied through a plate load resistor 77 in parallel with a speed-up capacitor 79 to diodes 49, 55 and 61. These diodes are thus cut off because of the negative potential applied to their plates. When a time slot is unassigned (that is, no target is being assigned) a negative pulse 106, as shown in Fig. 2k, from the assign coder 24 cuts off the control tube 63 raising the potential of its anode 65. This positive potential is applied to the diodes 49, 55 and 61 whereby cathode followers 85, 86 and 92 conduct sufficiently to cut off the three electron guns 97, 98 and 99. Thus, none of the electron guns 97, 98 and 99 is allowed to write during this unassigned time slot.

It will be understood, that, although the present invention is being illustrated and described in connection with a control over three elements the invention may have up to four control functions with two input channels of pulse trains. And three inputs may, with associated circuitry, control up to nine elements.

Other modifications of the illustrated embodiment will be apparent to those skilled in the art. It may be desirable, for example, to control the grid elements instead of the cathodes of the electron guns 97, 98 and 99. It may be preferred to eliminate the cathode followers 85, 86 and 92 and apply the potentials from the "AND" diode matrices 46, 52 and 58 directly to the electron guns 97, 98 and 99. Also, amplifiers may be provided to amplify the coded instructions applied to the first and second flip-flop networks 43 and 44. The invention herein described thus affords a relatively simple means for controlling a plurality of many types of elements by utilizing instructions in the form of trains of pulses and spaces, the pulses and spaces being transmitted over a plurality of channels.

Obviously many modifications and variations of the present invention are possible in the light of the above teachings. It is therefore to be understood that within the scope of the appended claims the invention may be practiced otherwise than is specifically described.

What is claimed is:

1. A decoder circuit for decoding instructions in the form of electrical pulses and spaces transmitted over a plurality of channels to control a plurality of electron guns of a multi-color cathode ray tube display, said plurality of electron guns being in excess of said plurality of channels, said multi-color cathode ray tube display including at least one fluorescent screen and means for individually controlling said electron guns; said decoder circuit comprising: means to receive said instructions in the form of electrical pulses and spaces from each said channel, potential selection means coupled to said receiving means for deriving opposite potentials in response to whether a pulse or a space is received on each said channel, translating means comprising diodes in an interlaced diode array responsive to said potential selection means, means to couple said translating means to said electron gun control means to selectively control the functioning of said electron guns in accordance with predetermined ones of said plurality of instruction being applied.

2. A decoder circuit for decoding instructions in the form of electrical pulses and spaces transmitted over a plurality of channels to control a plurality of electron guns of a multi-color cathode ray tube display, said display including at least one fluorescent screen and means for individually controlling said electron guns; said decoder circuit comprising: means to receive said instructions, monostable multivibrator means to convert said received instructions into amplified pulses of opposite potentials derived in accordance with said instructions, translating means coupled to said monostable multivibrator means, said translating means comprising diodes in an interlaced rectangular array, said translating means being responsive to the polarity and arrangement of said derived pulses, and means to couple said translating means to said electron gun control means to control the appearance of desired colors on said screens in response to the polarity of the derived pulses from said monostable multivibrator means.

3. A decoder circuit according to claim 2 including separate means for receiving additional instructions in the form of electrical pulses and spaces and coupling means for applying said pulses and spaces to said translating means to cut off all of said electron guns in response to the occurrence of a predetermined additional instruction.

4. A decoder circuit according to claim 3 including biasing means for applying individual bias voltages through said translating means to each said electron gun to control the beam intensity thereof.

5. A decoder circuit for decoding instructions in the form of electrical pulses and spaces transmitted over a plurality of channels to control a plurality of electron guns of a multi-color cathode ray tube display, said display including at least one fluorescent screen and means for individually controlling said electron guns; said decoder circuit comprising: means to receive said instructions, monostable multivibrator means deriving positive and negative potentials in the form of pulses corresponding to said received input pulses and spaces, connection means coupling said monostable multivibrator means and a plurality of diode matrix means, said connection means comprising an interlaced, rectangular array of a "halves" configuration, whereby said instructions determine the arrangement of said derived positive and negative potentials and at any one time only derived negative potentials are applied to one of said diode matrix means, simultaneously at least one derived positive potential is applied to each of the other diode matrix means, the output of each said diode matrix means connected to an individual electron gun control means, whereby the one of said electron guns associated with said diode matrix means having negative potential applied thereto will be energized and simultaneously the others of said electron guns will be cut off.

6. A decoder circuit for decoding instructions in the form of electrical pulses and spaces transmitted by two coders over two separate channels to control three electron guns of a multi-color cathode ray tube display, said display including at least one fluorescent screen; said decoder circuit comprising: a first flip-flop network including first and second electron tubes each having at least a cathode, an anode and a control grid, a common cathode resistor connected between a source of negative potential and the cathodes of both said first and second electron tubes, a first anode resistor connected between the anode of said first electron tube and a source of anode potential, a second anode resistor connected between the anode of said second electron tube and a source of anode potential, a first grid bias resistor connected between the grid of said first electron tube and a source of negative potential, a second bias resistor connected between the grid of said second electron tube and a source of negative potential, a third bias resistor connected between the grid of said second electron tube and a source of ground potential, and an input connection to the grid of said first electron tube from one of said coders, said input connection including a parallel resistor-capacitor combination, said various resistors in said flip-flop network having resistance values selected such that application of a space to the grid of said first electron tube results in cut off of that tube and conduction by said second electron tube and that application of a pulse to the grid of said first electron tube results in conduction by that tube and cut off of said second electron tube; a second flip-flop network identical to said first flip-flop network and having an input connection to the grid of its first electron tube from the other of said two coders; a first, a second and a third diode matrix, said first diode matrix including a first diode having its anode coupled to the anode of said second electron tube in said first flip-flop network and a second diode having its anode coupled to the anode of said second electron tube in said second flip-flop network, said first and second diodes having a common cathode output junction, said second diode matrix including a third diode having its anode coupled to the anode of said first electron tube in said first flip-flop network and a fourth diode having its anode coupled to the anode of said second electron tube in said second flip-flop network, said third and fourth diodes having a common cathode output junction, said third diode matrix including a fifth diode having its anode coupled to the anode of said first electron tube in said first flip-flop network and a sixth diode having its anode coupled to the anode of said first electron tube in said second flip-flop network, said fifth and sixth diodes having a common cathode output junction; a first coupling from the output junction of said first diode matrix to the cathode of a first one of said electron guns in said cathode ray tube display, a second coupling from the output junction of said second diode matrix to the cathode of a second one of said electron guns, and a third coupling from the output junction of said third diode matrix to a third one of said electron guns, each said coupling including an electron discharge device having at least an anode, a cathode, and a control grid, each said discharge device having its cathode connected through a resistor to a point of ground potential, a direct connection from its cathode to the cathode of an associated one of said electron guns, a connection for applying anode potential to its anode, and a connection to its grid from an associated one of said output junctions, to selectively energize said electron guns in response to predetermined combinations of pulses and spaces simultaneously applied to said two flip-flop networks to produce color displays in accordance with said instructions.

7. A decoder circuit according to claim 6 including an additional diode in each of said diode matrices, each said diode having its anode coupled through a variable resistor to a source of bias potential and its cathode coupled to the common cathode junction in each said diode matrix to provide intensity adjustment for each said electron gun.

8. A decoder circuit according to claim 7 including an additional decoding subcircuit for decoding additional instructions from a third decoder; said subcircuit including an electron tube having at least a cathode, an anode and a control grid, a connection to a source of cathode potential for said cathode, a connection through an anode resistor to a source of anode potential for said anode, and a connection from said third decoder to said grid; another diode in each said diode matrix, each said diode having its anode coupled to the anode of said electron tube in said subcircuit through a parallel resistor-capacitor combination and having its cathode coupled to the common cathode junction in each said diode matrix to disable all of said electron guns simultaneously in response to an appropriate instruction being applied to said subcircuit from said third coder.

References Cited in the file of this patent

UNITED STATES PATENTS

| | | |
|---|---|---|
| 2,557,729 | Eckert | June 19, 1951 |
| 2,759,998 | Labin | Aug. 21, 1956 |
| 2,814,035 | Curtis | Nov. 19, 1957 |
| 2,817,079 | Young | Dec. 17, 1957 |
| 2,835,729 | Flood | May 20, 1958 |